(12) United States Patent
Newhouse et al.

(10) Patent No.: US 12,196,619 B2
(45) Date of Patent: Jan. 14, 2025

(54) WIRELESSLY ENGAGED TEMPERATURE PROBE AND TEMPERATURE RESISTANT COMPONENTS THEREOF

(71) Applicant: RJ BRANDS, LLC, Mahwah, NJ (US)

(72) Inventors: Ralph Newhouse, Monsey, NY (US);
Jon O'Donnell, Fayetteville, OH (US);
Harold Brooks, Hollis, NY (US)

(73) Assignee: RJ BRANDS, LLC, Mahwah, NJ (US)

(*) Notice: Subject to any disclaimer, the term of this patent is extended or adjusted under 35 U.S.C. 154(b) by 453 days.

(21) Appl. No.: 17/721,738

(22) Filed: Apr. 15, 2022

(65) Prior Publication Data

US 2022/0333997 A1    Oct. 20, 2022

Related U.S. Application Data

(60) Provisional application No. 63/175,212, filed on Apr. 15, 2021.

(51) Int. Cl.
*G01K 1/024* (2021.01)
*G01K 1/12* (2006.01)

(52) U.S. Cl.
CPC .............. *G01K 1/024* (2013.01); *G01K 1/12* (2013.01); *G01K 2207/02* (2013.01); *G01K 2207/06* (2013.01)

(58) Field of Classification Search
CPC ... G01K 1/12; G01K 2207/06; G01K 2207/02
See application file for complete search history.

(56) References Cited

U.S. PATENT DOCUMENTS

| 2012/0225170 | A1 | 9/2012 | Sonnendorfer |
| 2016/0377490 | A1* | 12/2016 | Nivala ................ G01K 7/42 374/155 |
| 2021/0010870 | A1 | 1/2021 | Kristensen et al. |
| 2022/0117438 | A1* | 4/2022 | Lion .................... G01K 1/026 |

FOREIGN PATENT DOCUMENTS

| DE | 102012217357 A1 * | 3/2014 | ............. G01K 1/026 |
| EP | 2741061 A1 | 6/2014 | |
| WO | 2006035005 A1 | 4/2006 | |

OTHER PUBLICATIONS

International Search Report and Written Opinion of the International Searching Authority in relation to international application No. PCT/US2022/025008, dated Aug. 1, 2022, 6 pages.

* cited by examiner

*Primary Examiner* — Mirellys Jagan
(74) *Attorney, Agent, or Firm* — COZEN O'CONNOR

(57) ABSTRACT

The invention of the present disclosure may be a temperature probe comprising a probe body. The probe body may comprise a tip, a tube, a sleeve configured to join the tip and the tube, the sleeve having one or more tapered ends configured to at least partially enter the tip and the tube, and an end, where a cavity may extend from the proximal end to the distal end, and where the cavity may be internal to the tip, the tube, the sleeve, and the end. The temperature probe may comprise a printed circuit board (PCB) comprising a proximal rigid PCB, a flex PCB, and a distal rigid PCB and a temperature sensor disposed within the tip. A battery may be disposed between the proximal rigid PCB and the distal rigid PCB, the battery at least partially surrounded by the flex PCB.

14 Claims, 6 Drawing Sheets

WIRELESSLY ENGAGED TEMPERATURE PROBE AND TEMPERATURE RESISTANT COMPONENTS THEREOF

CLAIM OF PRIORITY

This application claims priority from U.S. Provisional Patent Application No. 63/175,212, filed on Apr. 15, 2021, the contents of which are incorporated herein by reference.

FIELD OF THE INVENTION

The invention is related generally to the field of household appliances. More particularly, the invention relates to apparatuses, methods, and systems for a temperature probe configured to transmit temperature information wirelessly.

INTRODUCTION

There are a number of thermometer devices on the market. Traditional thermometers, especially those designed for use in cooking, are difficult to read by a user. Often, a meat thermometer is not safe to examine because it requires a user to approach the inside of a hot oven or grill. Thus, it would be beneficial to the user to have a meat thermometer that can transmit the temperature to a device outside the oven or grill.

Many thermometers are digital or include some electrical components. However, a problem remains that electrical components are sensitive to damage from heat, which can cause the thermometer to degrade quickly or provide inaccurate readings. In particular, batteries and computing circuits may be the electrical components most sensitive to heat.

In the instance of a meat thermometer, the air surrounding a piece of meat is substantially hotter than the center of the meat. Thus, the portion of the thermometer that remains outside the meat is especially vulnerable to the high temperature inside a grill or oven. This creates issues with minimizing the footprint of the thermometer because the layout of the electrical components is constrained to where sensitive components must be buried in the meat where the temperature is lower.

It would be desirable to provide a temperature probe sized to house a battery in a location adapted to preserve the integrity of the battery. It would be further desirable to provide a temperature probe capable of transmitting temperature information to a charging device and/or smart device. The present thermometer overcomes the forgoing problems and others and enables users to accurately and reliably read the temperature within meat or other foods.

SUMMARY

The invention of the present disclosure may be a temperature probe comprising a probe body comprising a proximal end and a distal end. In an embodiment, the probe body may comprise a tip disposed on the proximal end; a tube; a sleeve configured to join the tip and the tube, the sleeve having one or more tapered ends configured to at least partially enter the tip and the tube; and an end disposed on the distal end, where a cavity extends from the proximal end to the distal end, and where the cavity is internal to the tip, the tube, the sleeve, and the end. The temperature probe may comprise a printed circuit board (PCB) comprising a proximal rigid PCB, a flex PCB, and a distal rigid PCB. A temperature sensor may be disposed within the tip, and the temperature sensor may be attached to the proximal rigid PCB. In an embodiment, a battery is disposed between the proximal rigid PCB and the distal rigid PCB, the battery may at least partially be surrounded by the flex PCB. The temperature probe may further comprise a microcontroller unit ("MCU") disposed on the distal rigid PCB, where the MCU may be in electrical communication with the battery, the temperature sensor, and an antenna. The antenna may be configured to emit a signal comprising temperature information.

In a further embodiment, the temperature probe further comprises a thermal conductive material disposed within the tip, where the thermal conductive material surrounds at least the temperature sensor. In another embodiment, the tube further comprises a tapered section, where the end includes an end diameter, where the tube includes a tube diameter, and where the tapered section is sized to taper from the tube diameter to the end diameter.

The temperature probe may further comprise an ambient temperature sensor disposed within the end (for example, a ceramic end), where the ambient temperature sensor comprises one or more leads. One of the one or more leads may be the antenna and the ambient temperature sensor may be in electrical communication with the MCU.

In another aspect, the temperature probe further comprises one or more proximal spring contacts and one or more distal spring contacts, the one or more proximal spring contacts may be disposed between the tip and the proximal rigid PCB, the one or more distal spring contacts may be disposed between the tube and the distal rigid PCB, where the one or more proximal spring contacts and the one or more distal spring contacts are configured to facilitate charging of the battery when the tip and the tube are interfaced with a charging device. The one or more proximal spring contacts and the one or more distal spring contacts may be further configured to facilitate pairing of the temperature probe with a smart device and/or the charging device. The one or more proximal spring contacts may be disposed non-orthogonally to an inner surface of the probe body, and the one or more distal spring contacts may be disposed orthogonally to the inner surface of the probe body.

In an embodiment, the tip and the tube are composed of stainless steel, and the end is composed of ceramic. Further, the sleeve may be composed of a non-conductive material (for example, an electrically non-conductive material). The temperature probe may further comprise a temperature signal conditioner in electrical communication with the MCU, where the temperature signal conditioner may be configured to calibrate the signal. The MCU may be in electrical communication with a flash memory comprising a unique identification number. In a further embodiment, a decal is disposed on the end, the decal may correspond to the unique identification number.

Additional aspects related to this disclosure are set forth, in part, in the description which follows, and, in part, will be obvious from the description, or may be learned by practice of this disclosure.

It is to be understood that both the forgoing and the following descriptions are exemplary and explanatory only and are not intended to limit the claimed disclosure or application thereof in any manner whatsoever.

These and other aspects, features, and advantages of the present invention will become more readily apparent from the following drawings and the detailed description of the preferred embodiments.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

Figure 1:
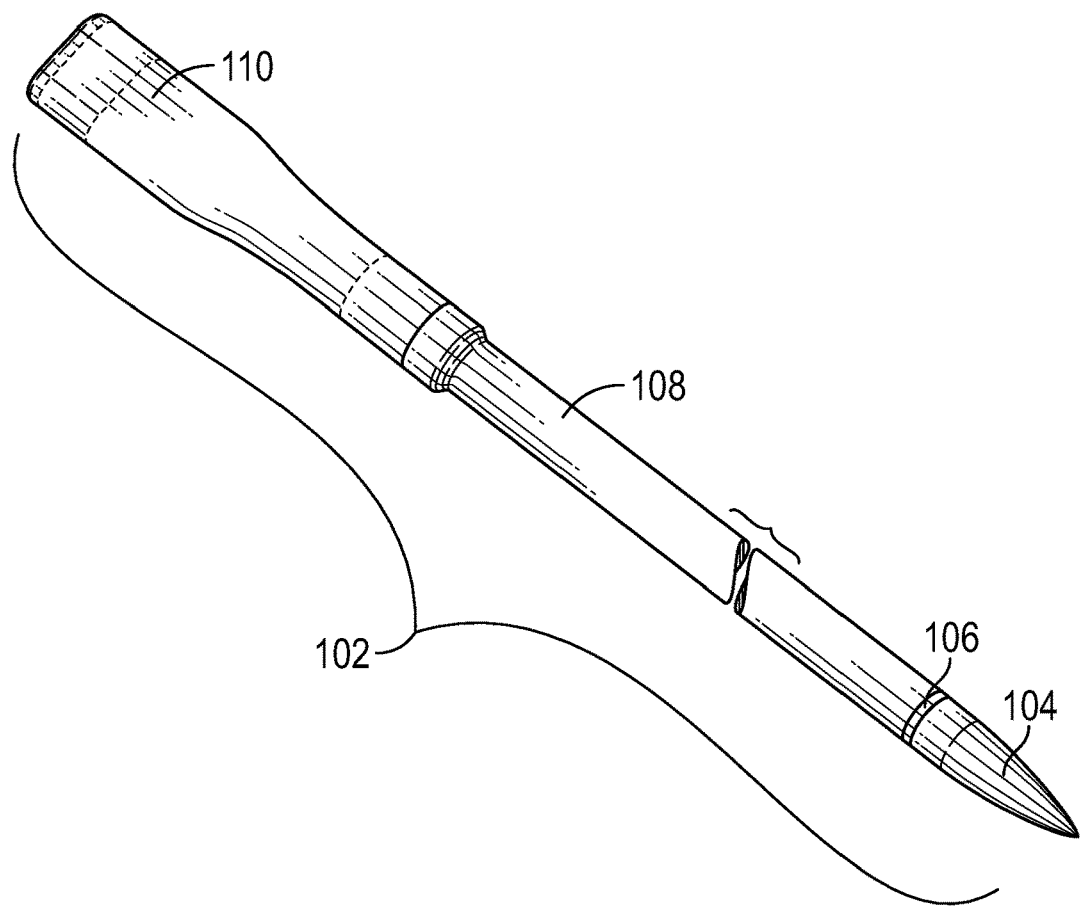
FIG. 1 is a perspective view of an embodiment of a temperature probe.
Figure 2:
FIG. 2 is a front view of an embodiment of a temperature probe.
Figure 3:
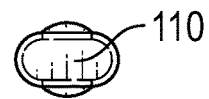
FIG. 3 is a back view of an embodiment of a temperature probe.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Throughout the specification, wherever practicable, like structures will be identified by like reference numbers. In some figures, components, such as additional electrical connections or fasteners have been omitted for clarity in the drawings. Unless expressly stated otherwise, the term "or" means "either or both" such that "A or B" includes A alone, B alone, and both A and B together.

The invention of the present disclosure may be a temperature probe 100 comprising, a probe body 102 comprising a tip 104, a sleeve 106, a tube 108, and an end 110 (for the purposes of this disclosure, the end 110 may also be referred to herein as the ceramic end 110). The temperature probe 100 may include a cavity 112 disposed within the probe body 102, a printed circuit board ("PCB") having a flexible portion and/or a rigid portion, a temperature sensor 116 disposed within the tip 104, a battery 118, and an antenna 120. Further, the temperature sensor 116, the battery 118, and the antenna 120 may each be in electrical communication with the PCB and the antenna 120 may be configured to send a signal comprising temperature information.

In an embodiment, the invention of the present disclosure is a thermometer. In an embodiment, the thermometer is a temperature probe 100. The temperature probe 100 may have a proximal end 122 (for example, configured to puncture foods items, such as meat) and a distal end 124 (for example, configured to remain external to the food item). The temperature probe 100 may include a probe body 102. The probe body 102 may have an inner surface 126 and an outer surface 128. The outer surface 128 may be treated with a heat protectant or may include a heat resistant layer. In one embodiment, the probe body 102 includes four portions: a tip 104, a sleeve 106, a tube 108, and an end 110. Each component of the probe body 102 may also have a corresponding proximal end and distal end. As a non-limiting example, the proximal end of the tip 104 may be the portion of the tip 104 closest to the proximal end 122 of the temperature probe 100 and the distal end of the tip 104 may be the portion of the tip 104 closest to the distal end 124 of the temperature probe 100.

The tip 104 may be a hollow stainless steel metal tip. The sleeve 106 may be electrically non-conductive and/or disposed between the tip 104 and the tube 108. In a further embodiment, the sleeve 106 may be thermally non-conductive. The sleeve 106 may be tapered at both the sleeve proximal end and sleeve distal end, such that both ends of the sleeve 106 are sized to fit into the hollow component of the tip 104 and tube 108. Further, the sleeve 106 may include a raised annular portion at the midpoint (or any other suitable location thereof) of the sleeve 106, wherein the raised annular portion is sized to create a near seamless outer surface 124 of the temperature probe 100 when the tip 104, sleeve 106, and tube 108 are attached. Further, such a raised annular portion may be configured to electrically isolate the tip 104 from the tube 108. The tube 108 may be composed in part, or in its entirety, from stainless steel. The end 110 may be a ceramic end. However, each of the components of the probe body 102 may appear in any order or configuration and may be made from any suitable material. The probe body 102 components may be coupled in a manner that creates a generally uniform and straight probe body 102. However, in alternate embodiments, the probe body 102 components may be curved or the manner in which the components are coupled may be angled, such that the probe body 102, viewed as a whole, includes a perceivable degree of curvature.

In an embodiment, the probe body 102 is hollow. In such an embodiment, the probe body 102 may have a cavity 112 or a channel that runs along the central axis of the temperature probe 100 from the proximal end 122 to the distal end 124. The cavity 112 may be sized to accept at least a temperature sensor 116, a PCB, and a battery 118. In an embodiment, the cavity 112 may be uniform and cylindrical. However, in alternate embodiments, the inner surface 126 of the probe body 102 may be contoured specifically to the geometry and/or size of components within the temperature probe 100.

In one embodiment, the ceramic end 110 is flared (for example, to make it easier for a user to retrieve the temperature probe 110 from a food item). In such an embodiment, the flare may taper from the narrow proximal end of the ceramic end 110 to the wider distal end of the ceramic end 110. The taper may be any contour or angle. The narrowest portion of the ceramic end 110 may be the same width as the tube 108 and/or sleeve 106. In an embodiment, one or more retainers or rings are disposed between the tip 104 and the tube 108 and/or between the tip 104 and the sleeve 106. In an embodiment, the tip 104 may be tapered from the distal end of the tip 104 to the proximal end of the tip 104 (for example, widening from the tip proximal end to the tip distal end). In such an embodiment, the proximal end of the tip 104 may have a point designed to allow the temperature probe 100 to more easily puncture meat or another food item. The distal end of the end 110 may be wider than the proximal end of the end 110 such that a user may more easily grasp the distal end of the end 110. Similarly, the thickness of the distal end of the end 110 may be less than thick than the proximal end of the end 110 to promote easier handling. In effect, the structure of the end 110 may widen and flatten to accommodate tactile manipulation by a user.

Figure 4:
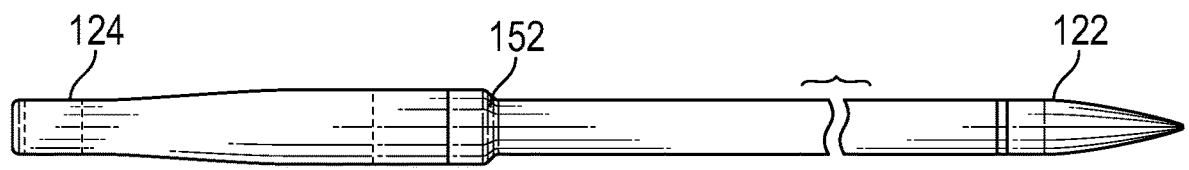
FIG. 4 is a right side view of an embodiment of a temperature probe.
Figure 5:
FIG. 5 is a left side view of an embodiment of a temperature probe.

The probe body 102 may include a tapered section 152, for example, upon the distal end of the tube 108 and/or the proximal end of the end 110, or a combination thereof. Accordingly, the tube 108 may flare out to a larger diameter in order to allow the end 110 to be of a larger diameter. Such a tapered section 152 may cause the temperature probe 100 to be more durable, specifically the end 110. Further, the tapered section 152 may be adapted for improved waterproofing of the temperature probe 100, as the increased diameter may allow for a greater adhesive surface area to form a seal between the tube 108 and the end 110. Moreover, the tapered section 152 may serve as both a visual indicator and a physical inhibitor as to inform a user of the appropriate insertion length of the temperature probe 100. For example, the tapered section 152 may be of a sufficient diameter to prevent the temperature probe 100 from being over-inserted into a food item. Similarly, the visually distinct tapered section 152 may act as a visual indicator to inform a user as to the insertion length that may provide the best readings and temperature probe 100 longevity. In effect, the position of the tapered section 152 may be a function of the centrally located battery 118 location, such that contact of the tapered section 152 to the outside surface of a food item sufficiently buries the battery 118 within said food item. The end 110 may be sized in a shorter length yet increased width as to decrease likelihood of damage to the end 110. For example, in an embodiment where the end 110 is composed of ceramic, the end 110 as shown in FIG. 4 may be sized to prevent ceramic shattering. In an embodiment, the tapered section 152 may be smooth and gradual. In another embodiment, the tapered section 152 may be stepwise or ribbed. The tapered section 152 may plateau for a short length after widening to the width of the proximal end of the end 110, for example, to provide a sufficient portion for adhesion to the end 110.

Figure 6:
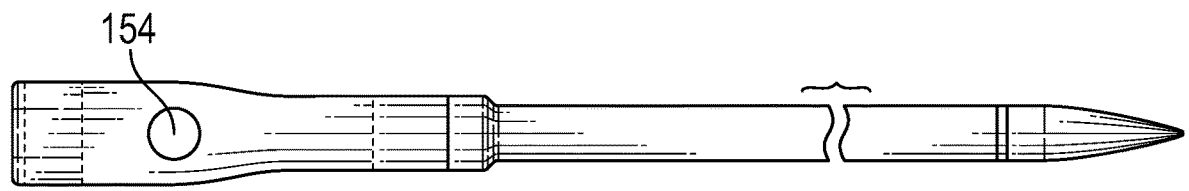
FIG. 6 is a top view of an embodiment of a temperature probe.
Figure 7:
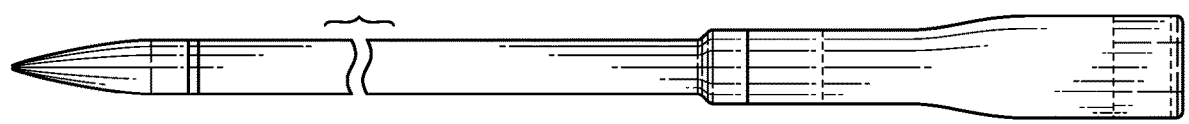
FIG. 7 is a bottom view of an embodiment of a temperature probe.

Referring to FIG. 6, the temperature probe 100 may include one or more decals 154 disposed on the end 110. However, the one or more decals 154 may be disposed on any of the components of the probe body 102. For the purposes of this disclosure, "decals" may refer to any marking, indentation, or other feature disposed on the temperature probe 100. For example, the decal 154 may be an engraving in the end 110. Alternatively, the ends of various temperature probes may be dyed unique colors to aid in visual identification. The decals 154 may be adapted to visually identify the temperature probe 110 as a particular probe. For example, if three temperature probes are utilized in a device suite, each of the three temperature probes may include a unique identifying decal 154. Thus, the user may be enabled to discern between the temperature probes, for example, to place each probe in a different location within the food item according to a recipe. Specifically, each temperature probe may be programmed with a globally unique identification number, for example, via Bluetooth protocol (for example, the Bluetooth Low-Energy protocol). As described in further detail below, each temperature probe may be assigned such a unique ID during the pairing process with the charging device. For example, the Bluetooth MAC address may be stored in flash memory 140 and may be the primary identification used internally. The probe number (for example, 1-5) and color or decal 154 may also be stored in flash memory 140 and may be used for identification to the user, charging device, and/or receiving device. As a non-limiting example, the temperature probe 100 may include a setup protocol configured to execute upon the first sync with the charging device. In an embodiment, once synced, each temperature probe may be in unidirectional Bluetooth communication with a receiving device, for example, broadcasting the particular probe's unique ID and accompanying temperature information. The temperature probe 100 may be configured to transmit such information at pre-determined frequencies (for example, every 10 seconds). Although, Bluetooth communication is described herein, any suitable means of wireless communication may be utilized.

In one embodiment, the temperature probe 100 may have a diameter of 4.8 mm, a tube wall thickness of 0.2 mm, and a tube inner diameter of 4.4 mm. In one embodiment, the tube wall thickness may be 0.1 mm. However, the temperature probe 100 and/or probe body 102 components may be any suitable dimensions. In an embodiment, the tip 104 and the tube 108 are composed of stainless steel. In an embodiment, the non-conductive sleeve 106 may be composed of any non-conductive food-safe material which can withstand at least 250° F. In an embodiment, the end 110 may be made from a ceramic, which may be configured to withstand higher temperatures. In another embodiment, the ceramic may be made transparent to radio frequency ("RF") signals and may not affect the performance of the antenna 120 within the cavity 112. In one embodiment, the end 110 may be made from a high-temperature plastic instead of, or in conjunction with, ceramic. In an embodiment, the non-conductive sleeve 106 may mechanically hold the tip 104 and the tube 108 without allowing said components 104/108 to touch. The sleeve 106 may also serve to hold the tip portion of the PCB in position. In one embodiment, the sleeve 106 in combination with spring contacts 130 on the PCB may hold the PCB with the temperature sensor 116 in position. The spring contacts 130 may collectively comprise proximal contacts 130A and distal contacts 130B.

In an embodiment, the temperature probe 100 is configured to withstand high temperatures. In one embodiment, the ceramic end 110 is configured to withstand temperatures greater than that of the tip 104. As a non-limiting example, the maximum temperature for the tip 104 may be 220° F., while the maximum temperature for the end 110 may be 900° F. However, in alternate embodiments, the temperature probe 110 or any component of the temperature probe 110 may be configured to withstand any reasonable range of temperatures.

In an embodiment, the temperature probe 110 includes a number of electrical components housed within the probe body 102. In one embodiment, the temperature probe 100 includes a temperature sensor 116. The temperature sensor 116 may be disposed within the tip 104 of the probe body 102. However, in alternate embodiments, the temperature sensor 116 may be disposed within the sleeve 106 or the tube 108. In another embodiment, a second temperature sensor may be disposed within the probe body 102 (for example, an ambient temperature sensor 132 in the ceramic end 110, to detect the temperature external to the meat). The temperature sensor 116 and/or the ambient temperature sensor 132 may be configured to determine whether either temperature reading poses a risk of damage to the temperature probe 100. The microcontroller unit 142 or the receiving device, for purposes of determining cooking time or making predictions on cooking time, may utilize the ambient temperature sensor 132. Thus, the MCU 142 or the receiving device may generate suggestions, modify an underlying program or recipe, or adjust another program aspect based on the signals delivered from the ambient temperature sensor 132. In an embodiment, the antenna 120 and the ambient temperature sensor 132 may be separate components. In another embodiment, the ambient temperature sensor 132 may be integral to the antenna 120. For example, one or more leads of the ambient temperature sensor 132 may be utilized as the antenna 120. The ambient temperature sensor 132 and/or the antenna 120 may be in communication with the MCU 142 via, for example, an analog/digital converter. The antenna 120 and the ambient temperature sensor 132 may be separable components, wherein each component is disposed within the distal end 124 and/or the ceramic end 110.

The ambient temperature sensor 132 and the temperature sensor 116 may each be in electrical communication with the receiving device (for example, the charging device or the smart device) independently. Accordingly, the receiving device may discern between information as recorded by the ambient temperature sensor 132 versus information as recorded by the temperature sensor 112. For example, the receiving device may make the determination of potential damage to the temperature probe 100 based on the information of each sensor 116/132. In an embodiment, the temperature probe 100 may not be configured to signal the user directly, thus, analysis of the signals from the sensors 116/132 and/or the determinations are made by rules on the receiving device. Such rules may include pre-determined temperature thresholds and/or differentials adapted to indicate whether a condition has been met or is imminent (for example, potential heat damage to the temperature probe 100)

In an aspect, the ambient temperature sensor 132 and temperature sensor 116 are different types of sensors, which are optimized for the expected temperature range. The temperature sensor 116 may be a NTC Thermistor (for example, a resistor which reduces value as temperature is increased) mounted directly on the PCB (for example, rigid proximal PCB 134) and is optimized for the lower temperatures found inside the food. The ambient temperature sensor 132 may be a PT100 PTC Thermistor (for example, a platinum based resistor which increases value as temperature increases) mounted on long wire leads (for example, the leads of the antenna 120 and/or otherwise within the end 110). Such a sensor may withstand the high ambient temperatures that would cause damage to a PCB or battery.

In an embodiment, the temperature probe 100 includes a battery 118. The battery 118 may be rechargeable. As a non-limiting example, the battery 118 may be a Lithium Titanate (LTO) battery or any suitable type of Lithium-Ion battery. Accordingly, LTO batteries may be chemically stable and not susceptible to thermal runaway. However, any suitable type of battery may be utilized. In an alternate embodiment, the temperature probe 100 includes more than one battery 118 (for example, a backup battery). In one embodiment, the battery 118 may be recharged by making electrical contact with the tip 104 and the tube 108 (for example, allowing a current to run from the tip 104 to the tube 108 or vice versa). In one embodiment, the tip 104 is the positive contact and the tube 108 is the negative contact. However, in an alternate embodiment, the battery 118 may be recharged by making electrical contact with any combination or number of probe body 102 components. In one embodiment, there are no visual indicators for the charging or communication function of the tip 104 and the tube 108. In another embodiment, the tip 104 and/or the tube 108 are marked with visual or tactile indicators (for example, indentations or windows on the tip 104 and/or the tube 108 configured to accept a charger or charger prongs). The charger may be designed to prevent reversing positive and negative contacts. In another embodiment, the temperature probe 100 may block power if the positive and negative are switched. As a non-limiting example, the tip 104 may be sized to accept a first portion of the charging device and the tube 108 may be sized to accept a second portion of the charging device. In such a non-limiting example, the tube 108 may not be accepted by the first portion of the charging device such that a user may not incorrectly position the temperature probe 100 in the charging device.

In one embodiment, the same contact arrangement used for charging the battery 118 may be used to communicate with the temperature probe 100 while charging. In an embodiment, such an implementation has three different voltages applied between the tube 108 and the tip 104. However, in an alternate embodiment, there may be any number of different voltages applied to the tube 108 and the tip 104. In one embodiment, falling below a first threshold (for example, 0.5V) may signal to the temperature probe 100 that the temperature probe 100 is not properly seated within a charging dock or the dock is not powered. In such an embodiment, a voltage above a second higher threshold (for example, 2V) initiates charging the battery 118. Further, a voltage between the low and high threshold may indicate that the charger is requesting communication with the temperature probe 100. In one embodiment, the communication is bi-directional with the temperature probe 100 and charger taking turns communicating (for example, a half-duplex). The temperature probe 100 may not be configured to charge the battery 118 and enable communication simultaneously. For example, the temperature probe 100 may be adapted to communicate at different voltages than during charging to enable consistent and accurate communication or charging. The communications may include information pertaining to configuration and capability information along with the capability of updating the firmware or software on the temperature probe 100. In an embodiment, the temperature probe 100 may be tagged or assigned during syncing with the charge device. For example, the temperature probe 100 may be configured to receive a tag or assignment such that the temperature probe 100 emits or otherwise is associated with the tag or assignment. Thus, a plurality of temperature probes may transmit temperature data to a receiving device, wherein the receiving device may decipher and sort the information from each temperature probe. Accordingly, the temperature probes may operate as a suite of probes, for example, enabling a smart device and/or the receiving device to instruct the user on cook times and other instructions based on the temperature differences along a food item.

In an embodiment, the temperature probe 100 includes an RF antenna 120. The RF antenna 120 may be configured to send information to a receiver. Although a BLE protocol is described herein, any suitable low-power RF protocol may be utilized. As a non-limiting example, the RF antenna 120 may send information regarding the temperature observed by the temperature sensor 116 to a receiver (for example, within the charging device or smart device). In such a non-limiting example, the receiver may be a component of an electronic device, such as a mobile phone. However, the electronic device may be a dedicated module, configured to receive a signal from the temperature probe 100 and display a temperature to the user. In one embodiment, the signal emitted by the RF antenna 120 is configured to inform a receiving device about the temperature of the food item (the temperature detected by the temperature probe 100). In such an embodiment, the receiving device may display the temperature of the food item to a user. In one embodiment, the RF antenna 120 resides within the distal end 124 of the probe body 102. However, in alternate embodiments, the RF antenna 120 may reside in any number or combinations of probe body 102 portions. In another embodiment, other components of the temperature probe 100 may serve as an RF antenna 120 (for example, the ambient temperature sensor 132). RF frequencies and/or changing temperature signals may be separated by filters at the point where the sensor wires connect to the PCB. In an embodiment, the temperature probe 100 is configured to send 2.4 GHz signals. However, in alternate embodiments, the temperature probe 100 may emit signals of any frequency. Referring to the diplexer 148, in one embodiment, the filtering is performed using 2 LC (inductor-capacitor) filters. The capacitors may be a low impedance path for high frequencies (RF) and a high impedance path for low frequencies (temperature data). The inductors may be a low impedance path for low frequencies (temperature data) and a high impedance path for high frequencies (RF). In such an embodiment, this may allow the two signals (RF and temperature data) to be directed to their low impedance path.

In various embodiments, signals from the temperature probe 100 may follow various transmission paths. For example, temperature information may originate at the temperature probe 100, transmit to the charging device, and ultimately reach a receiving device or smart device. Alternatively, the temperature probe 100 may directly transmit temperature information to a receiving device or smart device.

In an embodiment, the charging device (for example, a charging hub) acts as a relay between the temperature probe 100 and a receiving device or smart device (for example, because the range may be greater). In some instances, the underlying cooking device (for example, an oven, grill, smoker, etc.) may be constructed of a material that impedes RF signals and reduces the Bluetooth range of the temperature probe 100. The charging hub may be placed in close proximity (for example, less than 10 feet) to the temperature probe 100 and may relay the temperature information to the receiving device or smart device (such as a smart phone) either directly via Bluetooth/Wi-Fi or through a cloud network. The temperature probe 100 may transmit the temperatures two times per second (however, not all transmissions may be received by the hub due to interference). Thus, the frequency of transmissions from the temperature probe 100 may be adapted to compensate for potential failed transmissions. In a further embodiment, the charging hub relays the current temperature information less frequently.

The smart device (for example, a smart phone) may include an "Instant Read" feature that bypasses the hub or charging device. Such a feature may be used when the temperature probe 100 is temporarily inserted into a food item to check the temperature and then removed shortly thereafter.

In one embodiment, the temperature probe 100 includes a PCB with a thin flexible portion, for example, a flex PCB 136. In such an embodiment, the PCB may be maintained within the center of the temperature probe 100 by a combination of spring contacts 130 attached to the PCB. The spring contacts 130, in order to remain in contact with the tube 108 or the tip 104, may be partially compressed. Accordingly, if the spring contacts 130 are not sufficiently compressed, routine tolerance changes (for example, tube thickness, PCB thickness, or spring contact height) may result in the spring contacts 130 failing to sufficiently contact the tube 108 or the tip 104. Moreover, the PCB may shift a small distance after assembly due to impact or thermal expansion. In such a scenario, the spring contacts 130 may maintain contact with the tube 108 and the tip 104 even through such movements. In one embodiment, the PCB is held in place with four spring contacts 130 (for example, two on each rigid section). In a further embodiment, the PCB is maintained in place by one or more spring contacts 130, the battery 118, and/or slots in the non-conductive sleeve 106 and/or tip 104. However, in alternate embodiments, the PCB does not have a defined orientation in the temperature probe 100. In one embodiment, the PCB has spring contacts 130 that serve to make electrical contact between the PCB and electrically conductive tip 104 or tube 108 and also prevent unintentional contact between the PCB and tip 104 or sleeve 108. The distal spring contacts 130B may be disposed orthogonal to the inner surface 126 of the tube 108. However, as the tip 104 may include an inner diameter smaller than that of the tube 108, the proximal spring contacts 130A may be disposed in an angled manner, such that the proximal spring contacts 130A fit within the tip 104. For example, the proximal spring contacts 130A may be angled towards the proximal end 122 of the temperature probe 100.

Figure 8:
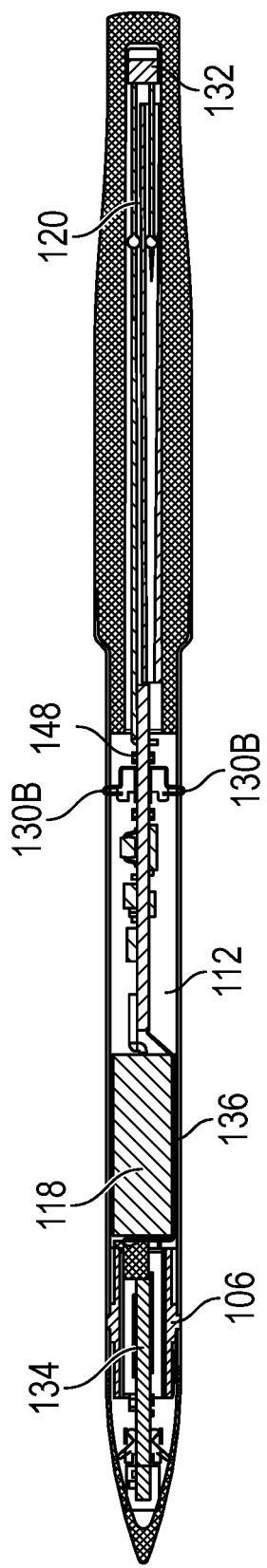
FIG. 8 is a section view of an embodiment of a temperature probe.
Figure 9:
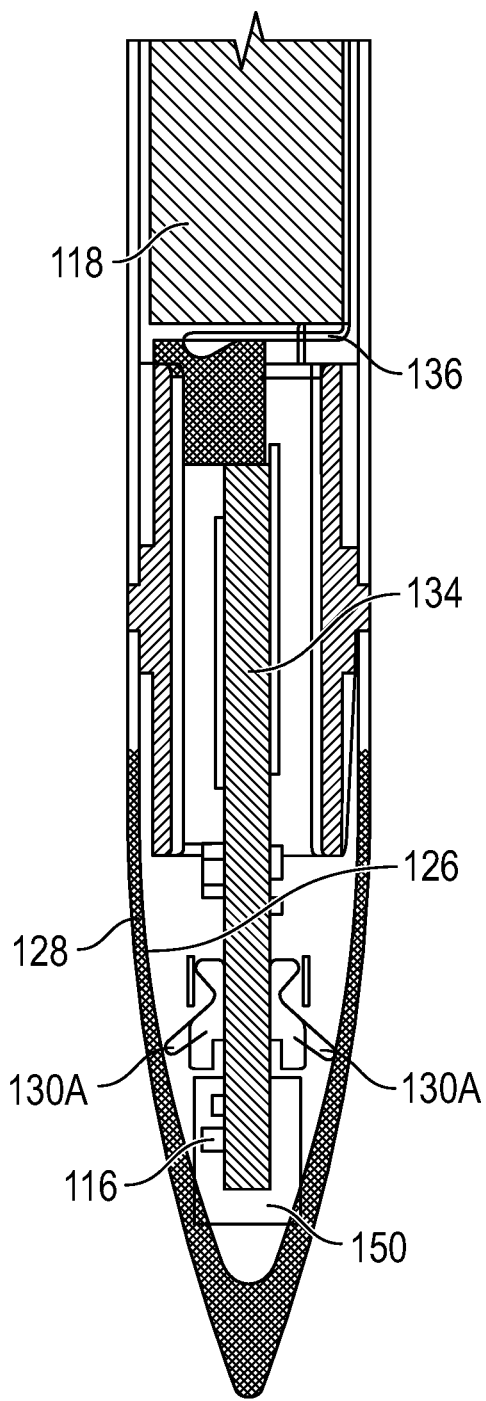
FIG. 9 is an enhanced section view of an embodiment of a temperature probe.
Figure 10:
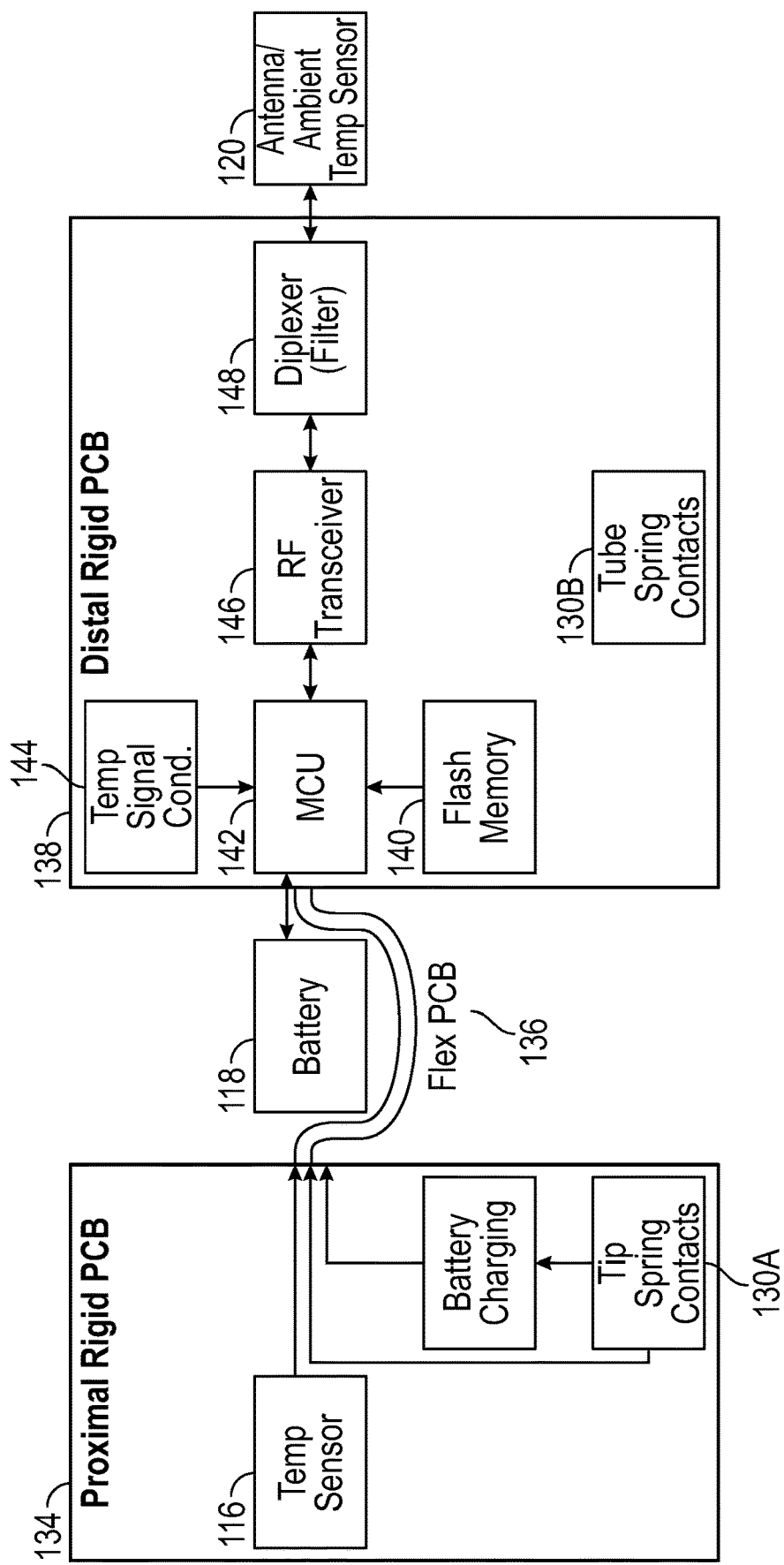
FIG. 10 is an illustration of circuitry components of an embodiment of a temperature probe.

The spring contacts 130 may comprise a body portion adapted to provide mechanical support. Such a body portion may further comprise the spring portion and an arm arranged to extend at an angle to make physical contact with inner surface 126. In an embodiment, the arm may be configured for a fixed angle relative to the body; however, the orientation of the entire spring contact 130 may be altered to accommodate the curvature of the inner surface 126 and/or the position of the PCB 134/138. For example, in the tip 104, the spring contact 130A may be positioned such that the arm is angled towards the proximal end 122, where the inner diameter of the cavity 112 narrows. Thus, the mechanical contact may be more reliable because the spring 130A is compressed. Conversely, if the spring contact 130A was positioned with the arm pointing away from the proximal end 122, the arm might not make sufficient contact with the larger diameter segment of the cavity 122 (for example, the inner portion of the tip 104 in closer proximity to the sleeve 106 than the proximal end 122). As shown in FIG. 8, the arms of the proximal spring contacts 130A may be angled towards the proximal end 122, while the arms of the distal spring contacts 130B may be orthogonal to the inner surface 126. However, the arms of the contacts 130 may be positioned in any manner adapted for secure support and electrical communications.

A thermal conductive material 150 may be disposed within the tip 104. The thermal conductive material 150 may be a three-dimensional member configured to fit within the tip 104 and to accept at least the temperature sensor 116, for example a thermal conductive pad. Further, the proximal rigid PCB 134 may also at least partially reside within the thermal conductive material 150. The thermal conductive material 150 may be configured to increase thermal conductivity and/or reduce electrical conductivity. Accordingly, the thermal conductive material 150 may increase the accuracy of the temperature sensor 116 by providing a thermally conductive material between the temperature sensor 116 and the inner surface 126 of the tip 104. Further, the thermal conductive material 150 may be composed of any suitable thermal conductive material, including but not limited to, thermally conductive electrically non-conductive elastomer, gel, paste, or putty. For example, a silicone elastomer may be utilized. Thus, the presence of thermal conductive material 150 may also more rapidly fluctuate in temperature, thus enabling the temperature sensor 116 to rapidly and accurately measure the food item temperature. The thermal conductive material 150 may allow the temperature sensor 116 to more rapidly fluctuate in temperature in conjunction with the temperature of the food. Thus, to maximize accuracy of the temperature sensor 116, the difference in temperature between the food and the temperature sensor 116 may be minimized. For example, when the temperature probe 100 is inserted into the food, the temperature sensor 116 should change rapidly to become the same temperature as the food. Moreover, if the food temperature changes, the temperature sensor 116 should change to the same temperature.

The PCB 114 may be rigid, flexible, or a combination of rigid and flexible. For example, a PCB 114 may have two flexible ends and a rigid middle portion. In such an example, the PCB 114 may be "flex-rigid-flex") Alternatively, the PCB 114 may be "flex-rigid," meaning one end of the PCB 114 is rigid, while the other end is flexible. In an embodiment, the rigid PCB at the tip 104 may make electrical contact with the metal tip 104 for charging and communication. In an alternate embodiment, the temperature sensor 116 may directly connect to the flex portion of the PCB 114, eliminating the need for a rigid portion at the tip 104. In an embodiment, the computing circuit is disposed on the rigid PCB. However, in an alternate embodiment, the computing circuit may be disposed on the flexible PCB or may be disposed auxiliary to the PCB 114.

As shown in FIG. 8, the PCB 114 may comprise a proximal rigid PCB 134, a flex PCB 136, and a distal rigid PCB 138. In one embodiment, the flexible portion 136 serves to connect the two rigid portions 134/138 and the flexible portion does not have any components disposed thereon. In an embodiment, components (for example, the temperature sensor 116) may be connected directly to the flexible portion 136 with or without the proximal rigid portion 134.

In an embodiment, the use of a flexible or semi-flexible PCB may allow the temperature sensor 116 to be at the proximal end of the tip 104, instead of the battery 118. This may provide for the most accurate reading, due to the location at the proximal end 122, which allows the temperature sensor 116 to reside within the food. Moreover, by positioning the temperature sensor 116 at the most proximal point within the tip 104, the device is formed with an ultra-thin profile. That is, due to the temperature sensor 116 being thinner than a battery 118, the placement of the temperature sensor 116 at the proximal tip allows for a thinner temperature probe 100 design. In such an embodiment, the battery 118 may be located along the middle of the probe body 102 (for example, in the tube 108). The PCB 114 may have a proximal end and a distal end. In an embodiment, the proximal rigid PCB 134 may be coupled to the temperature sensor 116 and the distal rigid PCB 138 may be coupled to the RF antenna 120. In an embodiment, proximal rigid PCB 134 may connect to the flexible PCB 136 and the flexible PCB 136 may connect to the distal rigid PCB 138. In an embodiment, the proximal rigid PCB 134 is closer to the proximal end 122 of the probe body 102 and the distal rigid PCB 138 is closer to the distal end 124 of the probe body 102. Further, both the proximal rigid PCB 134 and distal rigid PCB 138 may have proximal and distal ends. In one embodiment, the temperature sensor 116 is mounted at the proximal end of proximal rigid PCB 134. The flexible PCB 136 may connect the distal end of proximal rigid PCB 134 to the proximal end of the distal rigid PCB 138. The battery 118 may be connected to the proximal end of distal rigid PCB 138. However, in an alternate embodiment, the battery 118 may connect to the proximal rigid PCB 134 or flexible PCB 136. In an embodiment, the flexible PCB 136 bends around the battery 118. In an embodiment, the computing circuit and memory are located near the proximal end of the distal rigid PCB 138. The antenna 120 may be connected to the distal end of the distal rigid PCB 138.

The computing circuit board may be disposed atop the surface of the PCB (for example, the distal rigid PCB 138 and/or the proximal rigid PCB 134). Further, the flexible portion 136 of the PCB may be positioned between the battery 118 and the inner surface 126 of the temperature probe 100. In such an embodiment, the battery 118 may also be coupled to the PCB (for example, to the flexible portion 136, proximal rigid PCB 134, or distal rigid PCB 138). The flexible PCB 136 may be of a sufficient thickness relative to the cavity 112 to enable the presence of the battery 118 within the tube 108. In effect, by providing a thin flexible PCB 136, the temperature sensor 116 may be disposed at the proximal end 122 and the battery 118 may be disposed in the tube 108, such that said section of tube 108 is surrounded by the food item when the temperature probe 100 is in use. Thus, the battery 118 may be exposed to the temperature within the food, where the temperature within the food is less than that of the surrounding air. Accordingly, the use of a flexible PCB 136 enables the battery 118 to be placed in a safe location without displacing the temperature sensor 116 from the most temperature-significant portion of the temperature probe 100: the proximal end 122. Conversely, use of a uniform rigid PCB may provide little room for the battery 118 within the cavity 112, forcing the battery 118 to be placed at the proximal end 122, and further causing the temperature sensor 116 to be positioned more centrally to the temperature probe 100 in a less temperature-significant location. Therefore, the flexible PCB 136 may enable communication between the proximal rigid PCB 134 and the distal rigid PCB 138, enable proximal disposition of the temperature sensor 116, and partially cradle the battery 118 to allow for safe positioning of the battery 118 within the tube 108. However, in alternate embodiments, the battery 118 and/or the flexible PCB 136 may partially or completely reside within the tip 104, the sleeve 106, and/or the tube 108.

The temperature probe 100 may be arranged in a variety of lengths. In one embodiment where the temperature probe 100 is longer, the metal tube 108 and the ambient temperature sensor 132 wires and/or RF antenna 120 wires may both be longer (for example, by 25 mm). In another embodiment where the temperature probe 100 is longer, the probe body 102 may include another portion (for example, a second tube disposed between the tube 108 and the ceramic end 110). In an embodiment, since the ambient temperature sensor 132 wires also act as the antenna 120, the sensitivity of the portion of the antenna 120 inside the metal tube 108 may be significantly reduced. However, in some embodiments, the length of the antenna 120 beyond the metal tube 108 and inside the ceramic end 110 may be the same, regardless of the total length of the temperature probe 100. In an embodiment where a rigid PCB is used, wires may be used to connect the PCB to the temperature sensor 116 and/or other components of the temperature probe 100.

In one embodiment, the proximal rigid PCB 134 may include the temperature sensor 116 and proximal spring contacts 130A (for example, configured to enable battery charging). In such an embodiment, the proximal rigid PCB 134 may be connected to the distal rigid PCB 138 with a portion of flexible PCB 136. Further, in such an embodiment, the battery 118 may be disposed between the proximal rigid PCB 134 and the distal rigid PCB 138. In such an embodiment, the distal rigid PCB 138 may include a flash memory 140, a microcontroller unit 142, a temperature signal conditioner 144, an RF transceiver 146, a diplexer 148 (for example, configured to act as a filter), and distal spring contacts 130B. Thus, the diplexer 148 may be configured to separate the RF antenna signals from the ambient temperature signals. An antenna 120 and/or an ambient temperature sensor 132 may be attached to the distal end of the distal rigid PCB 138. In an embodiment, the battery 118 may be in electrical communication with the distal rigid PCB 138. The temperature signal conditioner 144 may be adapted to apply a calibration to account for part-to-part variability in the internal analog/digital converter. Accordingly, the temperature signal conditioner 144 is configured to compensate for variability amongst various chips.

In an embodiment, the flash memory 140 and/or microcontroller unit ("MCU") 142 may include computer-executable instructions. The MCU 142 may include integral memory, however, if such memory is insufficient for this application, a separate flash memory 140 may be utilized. In one embodiment, the computer executable instructions may instruct the temperature probe 100 on transmitting signals regarding temperature information or other device characteristics. For example, the temperature probe 100 may be configured to instruct the receiving device on the current level of battery charge. In another embodiment, the temperature probe 100 may include a battery charge indicator or another indicator light. In such an embodiment, an indicator light may be disposed on the outside surface of the probe body 102. The indicator light may present different colors, blinking patterns, or another indication to reflect the charge status of the temperature probe 100. The indicator light may also illuminate in some manner if the temperature probe 100 is "syncing" to the receiving device.

In an embodiment, the temperature probe 100 allows for non-RF communication while interfacing with the charging device. Accordingly, such non-RF communication between the charging device and the temperature probe 100 facilitates one or more software elements. For example, said software elements may include, but are not limited to, the initial syncing, firmware updates, and charging status. The charging device may be a component of, or may be in electrical communication with, a smart device, appliance, computer, smart phone, or other similar computing device. The charging device may be configured to deliver the software elements and or other information to the temperature probe 100 via the non-RF communication that may be initiated during interfacing of the temperature probe 100 and the charging device. In an embodiment, the various software elements and/or other information transmitted from the charging device to the temperature probe 100 may be stored within the flash memory 140 for future execution by the MCU 142. However, in another embodiment, the MCU 142 may execute the software element, instructions, or other commands from the charging device upon transmission of said software element, instruction, or other command.

The charging device or hub may perform multiple functions. For example, the hub may charge the temperature probe 100. Referring to the initial syncing and/or pairing of the temperature probe 100, in order to distinguish multiple temperature probes transmitting simultaneously, each temperature probe may include a unique identifier (MAC). Accordingly, when the temperature probe 100 is docked in the hub, the unique identifier is communicated to the hub through the charging contacts 130. Similarly, firmware updates may be performed through charging contacts 130. Further, the charging device may function as a measurement relay, as described earlier. In an embodiment, the charging device may be configured to deliver alarms and/or alerts. In such an embodiment, the charging device may include a speaker. In one embodiment, to reduce reliance on the "app" being open on a smart phone, the phone "app" may instruct the charging hub to monitor temperatures and generate audio alerts when certain conditions are met. Additionally, the charging device may provide storage for the temperature probe 100 when not in use.

In an embodiment, when a temperature probe 100 is interfaced with the hub charging slot, a voltage is applied (for example, 3V) which the probe uses to charge the battery. Periodically, the hub may reduce this voltage to a lower level (for example, less than 1.8V). The probe may detect this change, cease charging, and begin listening for communications (for example, alternating high [>1V] and low [<0.5V]). If communications are detected, the temperature probe 100 may transmit information back to the hub using the same protocol. In an embodiment, when the voltage returns back to 3V, charging will resume. Typically, such a communication may only last a fraction of a second unless a firmware update is being performed. However, the charging device and the temperature probe 100 are configured for any duration of communication.

Figure 11:
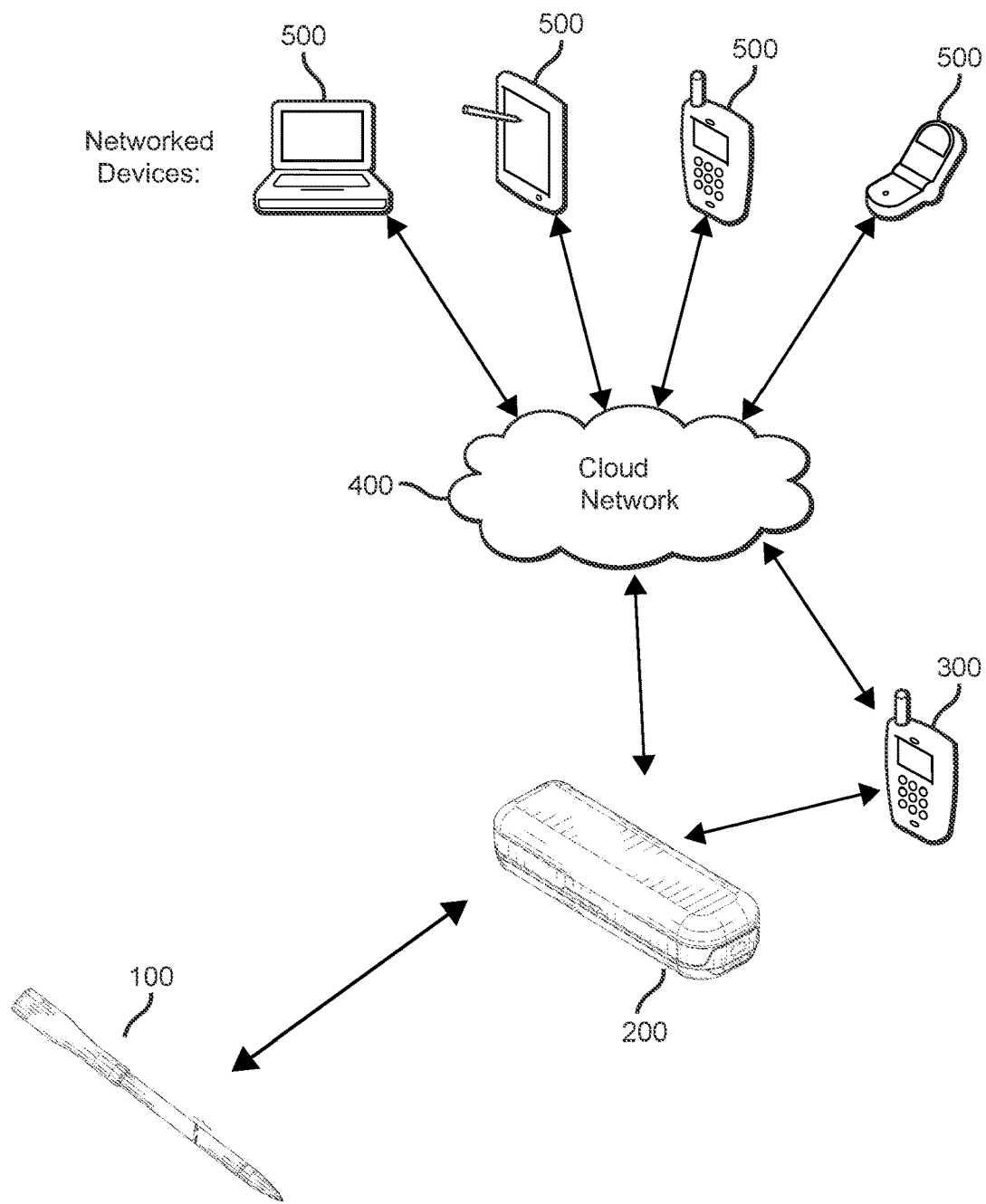
FIG. 11 is an illustration of a network connecting various embodiments of temperature probes, charging devices, and smart devices.

FIG. 11 is an illustration depicting a system comprising a temperature probe 100, a charging device 200, a smart device 300, a cloud network 400, and various networked devices 500. In an embodiment, the temperature probe 100 may be in wireless communication with the charging device 200, for example, communicating temperature information. The charging device 200 may be in communication with a smart device 300 and/or the cloud network 400. Thus, in various embodiments, the smart device 300 may recall temperature information form the cloud network 400 and/or the charging device 200. Furthermore, one or more networked devices 500 may be in communication with the cloud network 400. As non-limiting examples, the networked devices 500 may include internet-connected smart cookers, personal computers, smart phones, or other appliances. In such examples, the networked devices 500 may utilize temperature information as generated by the temperature probe 100. In alternate embodiments, the temperature probe 100 may communication directly with the smart device 300. The charging device 200 may include a display or other means of informing the user of the temperature as detected by the temperature probe 100 or suite of probes. The smart device 300 may include an "app" or other software element configured to display a user interface to the user. Such a user interface may display each temperature probe and corresponding temperature detected by each. Further, such an "app" may display alerts or warnings, charging information, or cooking progress. For the purposes of FIG. 11, the temperature probe 100, charging device 200, smart device 300, network 400, and networked devices 500 may include any of the characteristics of each component as described throughout the detailed description.

Although the present device and system has been described in terms of various embodiments, it is to be understood that such disclosure is not intended to be limiting. Various alterations and modifications will be readily apparent to those of skill in the art. Accordingly, it is intended that the appended claims be interpreted as covering all alterations and modifications as fall within the spirit and scope of the invention.

What is claimed is:

1. A temperature probe comprising:
a probe body comprising a proximal end and a distal end, the probe body comprising:
a tip disposed at the proximal end;
a tube;
a sleeve configured to join the tip and the tube, the sleeve having one or more tapered ends configured to at least partially enter the tip and the tube; and
an end disposed at the distal end,
wherein a cavity extends from the proximal end to the distal end, and
wherein the cavity is internal to the tip, the tube, the sleeve, and the end;
a printed circuit board (PCB) comprising a proximal rigid PCB, a flex PCB, and a distal rigid PCB;
a temperature sensor disposed within the tip, the temperature sensor being attached to the proximal rigid PCB;
a battery disposed between the proximal rigid PCB and the distal rigid PCB, the battery being at least partially surrounded by the flex PCB; and
a microcontroller unit ("MCU") disposed on the distal rigid PCB, the MCU being in electrical communication with the battery, the temperature sensor, and an antenna;
the antenna being configured to emit a signal comprising temperature information.

2. The temperature probe of claim 1, further comprising a thermal conductive material disposed within the tip, the thermal conductive material surrounding at least the temperature sensor.

3. The temperature probe of claim 1, the tube further comprising a tapered section,
wherein the end includes an end diameter,
wherein the tube includes a tube diameter, and
wherein the tapered section is sized to taper from the tube diameter to the end diameter.

4. The temperature probe of claim 1, further comprising an ambient temperature sensor disposed within the end, the ambient temperature sensor comprising one or more leads,
wherein one of the one or more leads is the antenna, and wherein the ambient temperature sensor is in electrical communication with the MCU.

5. The temperature probe of claim 1, wherein the tip and the tube are composed of stainless steel, and wherein the end is composed of ceramic.

6. The temperature probe of claim 1, wherein the sleeve is composed of an electrically non-conductive material.

7. The temperature probe of claim 1, further comprising a temperature signal conditioner in electrical communication with the MCU, the temperature signal conditioner being configured to calibrate the emitted signal.

8. The temperature probe of claim 1, wherein the MCU is in electrical communication with a flash memory comprising a unique identification number.

9. The temperature probe of claim 8, further comprising a decal disposed on the end, the decal corresponding to the unique identification number.

10. The temperature probe of claim 1, further comprising one or more proximal spring contacts and one or more distal spring contacts, the one or more proximal spring contacts being disposed between the tip and the proximal rigid PCB, the one or more distal spring contacts being disposed between the tube and the distal rigid PCB,
wherein the one or more proximal spring contacts and the one or more distal spring contacts are configured to facilitate charging of the battery when the tip and the tube are interfaced with a charging device.

11. The temperature probe of claim 10, wherein the one or more proximal spring contacts are disposed non-orthogonally to an inner surface of the probe body, and wherein the one or more distal spring contacts are disposed orthogonally to the inner surface of the probe body.

12. The temperature probe of claim 10, wherein the one or more proximal spring contacts and the one or more distal spring contacts are further configured to facilitate electrical communication of the temperature probe with a smart device.

13. The temperature probe of claim 12, wherein the electrical communication of the temperature probe with the smart device comprises a non-RF communication with the smart device, and wherein said communication facilitates transmission of one or more software elements to a flash memory in electrical communication with the MCU.

14. The temperature probe of claim 13, wherein the one or more software elements comprises an initial pairing, one or more firmware updates, and a charging status.

* * * * *